United States Patent [19]

Hellsten

[11] Patent Number: 4,876,122
[45] Date of Patent: Oct. 24, 1989

[54] PACKAGE CAPABLE OF PREVENTING FOAM FORMATION, METHOD OF MANUFACTURING SUCH A PACKAGE, AND ANTIFOAMING AGENT

[75] Inventor: Martin Hellsten, Ödsmål, Sweden

[73] Assignee: Berol Kemi AB, Stenungsund, Sweden

[21] Appl. No.: 171,745

[22] Filed: Mar. 22, 1988

[30] Foreign Application Priority Data

Apr. 6, 1987 [SE] Sweden ............................. 8701429

[51] Int. Cl.$^4$ ..................... B65D 85/72; D21H 1/40
[52] U.S. Cl. .............................. 428/34.1; 428/34.2; 428/36.92; 428/407; 428/411.1; 428/537.5; 428/704; 252/174.21; 252/305; 252/321; 252/358
[58] Field of Search .............. 252/358, 174.21, 305, 252/321; 428/35, 34.2, 36.92, 407, 411.1, 704, 537.5

[56] References Cited

U.S. PATENT DOCUMENTS 4,275,244  6/1981  Helfert et al. ................. 568/624
4,364,777  12/1982 Grünert et al. ................. 134/29
4,522,740  6/1985  Schmid et al. ............. 252/174.16
4,548,729  10/1985 Schmid et al. ................ 252/358
4,624,713  11/1986 Morganson et al. ........ 252/174.16

FOREIGN PATENT DOCUMENTS 639730  4/1962  Canada ........................... 252/358

OTHER PUBLICATIONS

Encyclopedia of Polymer Science & Technology, vol. 2 pp. 166–168, & vol. 13 p. 410, (Antifoaming Agents & Surface-active Agents).

Primary Examiner—Ellis P. Robinson
Assistant Examiner—Archene A. Turner
Attorney, Agent, or Firm—Birch, Stewart, Kolasch & Birch

[57] ABSTRACT

A package capable of preventing the formation of foam when being filled with liquid aqueous products, in which at least a part of the inside of the package is coated on the inside with an antifoaming agent which comprises an antifoaming, water-insoluble compound encapsulated in crystalline urea. In the manufacture of the package, the crystalline urea and the antifoaming compound are dissolved in a mixture of water and an organic solvent forming a solution, and applying the solution to at least a part of the inner side of the material forming the package, whereupon the solvent is driven off.

14 Claims, No Drawings

PACKAGE CAPABLE OF PREVENTING FOAM FORMATION, METHOD OF MANUFACTURING SUCH A PACKAGE, AND ANTIFOAMING AGENT

The present invention relates to a package capable of preventing foam formation when being filled with liquid aqueous products. The present invention also relates to a method for manufacturing such a package and to an antifoaming agent.

When filling packages with liquid aqueous products, foam is often formed to such an extent that the subsequent closing of the package is hampered or even made impossible. This is the case e.g. when packaging milk, juice and liquid dish-washing and washing detergents.

The method most commonly used for solving this problem is suction off the foam from the surface layer of the liquid immediately after or during the final phase of the filling operation. This method however suffers from two major shortcomings. One is that the foam suctioned off, which generally amounts to some tenths of percent of the total amount of liquid poured into the package, must usually be rejected because it is not of a composition which is identical with that of the starting product. The second shortcoming, which primarily concerns foodstuffs, is that the pipe which is inserted into the package to suction off the foam, may be infected and thus it may spread undesired microorganisms to all of the packages which have been filled. It is therefore desirable to provide a package having a design which would prevent foam formation when the package is being filled.

SUMMARY OF THE INVENTION

It is now surprisingly found that foam formation can be prevented if at least a part of the inner side of the material forming the packages, were to be coated with a small amount of an antifoaming agent. The antifoaming agent is comprised of an antifoaming, water-insoluble compound encapsulated in crystalline urea. In order to produce a satisfactory antifoaming effect, the compound should be water-insoluble, it being understood that less than 1% by weight, preferably less than 0.1% by weight, is soluble in water at 20° C.

Urea is a readily crystallizable substance which, upon crystallization from a solvent, which is common to an organic compound and the urea, is capable of forming crystals in which the organic compound is encapsulated. As disclosed in European Patent Application 182,461, this property has been used for formulating a powdered rinsing agent wherein a surface-active, water-soluble compound is encapsulated in the urea so as to avoid tackiness and to obtain a free-flowing powder.

The problem to be solved by the present invention is a completely different one. Since, in present-day machines, the time required for filling a package with liquid is very short, the antifoaming agent must produce an instant effect. According to the present invention, it has now been found that an antifoaming agent consisting of urea crystals in which an antifoaming water-insoluble compound has been encapsulated, produces the desired effect in that the urea rapidly dissolves in the liquid to be packaged and rapidly releases the antifoaming compound in finely divided form. One reason why the inner side of the package cannot be coated with the antifoaming compound only is that, for reasons of manufacture, this coating operation is conveniently done while the packaging material is still in a planar form, i.e. before the final package has been formed. Since the antifoaming compound is an effective solvent for certain components of printing ink, when the blanks for the manufacture of the packages are stacked, the printing ink may be transferred to the inner side of the package blanks, thus damaging the print. By encapsulating the antifoaming compound in crystalline urea, the printing ink will be in contact only with the urea, and no transfer of printing ink from the outer side of one package blank to the inner side of the adjacent blank would occur.

The package according to the present invention is suitably manufactured by dissolving urea and the antifoaming compound in desired proportions in a mixture of water and an organic polar solvent forming a solution, and applying this solution to at least a part of the inner side of the material forming the package, whereupon the solvents are driven off. Suitably, the solution is applied when the packaging material has a substantially two-dimensional extent. The organic solvent preferably consists of a lower alcohol, a monoalkyl alkylene glycol ether or a lower alkyl ester of a lower fatty acid, or mixtures thereof. Examples of such solvents are methanol, ethanol, propanol, monoethyl ethylene glycol ether and ethyl acetate. Of these solvents, ethanol is preferred. The amount of organic solvent to water generally is from 1:10 to 10:1.

The antifoaming water-insoluble compound according to the present invention preferably has a molecular weight of 400–10,000, preferably 1000–6000, and consists of at least 40, preferably at least 80% by weight of alkylenoxy groups having 2–4 carbon atoms, at least 60% of which are alkylenoxy groups having 3–4 carbon atoms. The content of ethylenoxy groups preferably is below 18% by weight.

Examples of suitable anitfoaming compounds are polypropylene glycols having a molecular weight of 1000–6000 or ethers thereof with alcohols having 1–12 carbon atoms, or esters of said glycols with carboxylic acids having 2–12 carbon atoms. Other suitable compounds are polyalkylene glycols derived from at least two different alkylene oxides having 2–4 carbon atoms wherein the different alkylene oxides may be randomly distributed or arranged in segments, or ethers or esters thereof. The molecular weight suitably is 2000–6000.

In addition to alkylenoxy groups, the antifoaming compound may also advantageously contain hydrocarbon groups having 1–30 carbon atoms. Preferred antifoaming compounds are those comprised of the general formula $$R[X(A_1)_{n_1}(A_2)_{n_2}]_m H \qquad I$$

wherein R is a hydrocarbon group having 1–30 carbon atoms, hydrogen or a group of the formula $R_1(A_3)_{n_3}$ wherein $R_1$ is hydrogen or a hydrocarbon group having 1–30 carbon atoms, $A_3$ is an alkylenoxy group having 2–4 carbon atoms, $n_3$ is a number from 0 to 30, X is

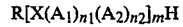

or —S—, $A_1$ and $A_2$ are each an alkylenoxy group having 2–4 carbon atoms, $n_1$ and $n_2$ are each numbers from 0 to 100, m is a number 1–4, $n_1$, $n_2$, $n_3$ and m being so selected that the total number of alkylenoxy groups is from 15 to 120, preferably 25-90. m preferably is the number 1. Suitably at least 50, preferably at least 70% of the number of $A_1$ groups are alkylenoxy groups having 3-4 carbon atoms, and at least 50, preferably at least 70% of the number of $A_2$ groups are ethylenoxy groups. The groups R and $R_1$ are each preferably hydrogen or an aliphatic saturated group having 1-20 carbon atoms, while X preferably is an ether or ester group.

Other examples of antifoaming compounds are alkoxylated alkyl amines of the general formula

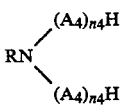    II wherein R is a hydrocarbon group having 1-20 carbon atoms or the group $(A_4)_{n4}H$, $A_4$ is an alkylenoxy group having 2-4 carbon atoms, at least 60, preferably at least 80% of the alkylenoxy groups being alkylenoxy groups having 3-4 carbon atoms, and $n_4$ is a number from 4-30. The alkylenoxy groups may be arranged in two or more segments or randomly distributed or arranged in a combination of segment and random distribution.

A preferred group of compounds can be summarized by the formula $$R_1O(C_2H_4O)_{n3}(A_1)_{n1}(A_2)_{n2}H \quad III$$

wherein $R_1$ is an aliphatic saturated group having 1-12 carbon toms, $A_1$ and $A_2$ are each an alkylenoxy group having 2-4 carbon atoms, the number of $A_1$ groups which are alkylenoxy groups having 3-4 carbon atoms being at least 70% of the total number of $A_1$ groups, and the number of $A_2$ groups which are ethylenoxy groups being at least 70% of the total number of $A_2$ groups, $n_1$ is a number from 20 to 70, $n_2$ is a number from 6 to 30, and $n_3$ is a number from 0 to 5.

The compounds of formula III exhibit a good antifoaming capability when used according to the present invention. The reason for this probably is that the compounds have the capability of readily orienting themselves in interfaces between the air and the aqueous liquid since they have a hydrophilic end with a free hydroxyl group and a hydrophobic end with a hydrocarbon group at the end position. At the same time, they have a large number of polar groups and, hence, are readily dispersed in water.

The ratio of urea to antifoaming compound generally is within the range of 9:1-1:1, preferably within the range of 8:1-3:2. The amount of antifoaming agent of course varies with both the type of liquid to be packaged, the method in which it is filled into the package, and the size and design of the package. For a one-liter package of milk, the antifoaming compound is suitably used in an amount of 5-500 mg, preferably 10-100 mg.

EXAMPLE 1

One of the antifoaming compounds stated below is dissolved in an amount of 10 g together with 20 g of urea in a mixture of 90 parts by weight of 95% ethanol and 10 parts by weight of water such that the total volume of the solution is 100 ml. The antifoaming compounds has the following composition:

$C_3H_7O(C_3H_6O)_{31}(C_2H_4O)_9H$ $C_2H_5O(C_2H_4O)_{10}(C_3H_6O)_{69}H$ $C_2H_5O(C_2H_4O)_{20}(C_3H_6O)_{69}H$ 0.30 ml of the solution is evenly distributed over a rectangular surface at the top of inner side of the blank for a one-liter cardboard package for skim milk. The size of the coated surface is 5000 mm². The mixture of ethanol and water is evaporated by means of a flow of hot air. When the solvent has evaporated, the coated surface felt completely dry and completely devoid of all tackiness. In this manner, the coated surface has been supplied with 30 mg of the antifoaming compound encapsulated in 60 mg urea. According to this method, 100 cardboard blanks are treated for each solution. In a packing machine for milk, 10 untreated cardboard blanks are placed together with the treated blanks. All the blanks has previously been folded and welded together by a vertical joint. In the packing machine, the blanks are raised, unfolded, welded at the bottom and filled with skim milk in two stages, whereupon the package is sealed by welding together with top tabs. No mechanical suction is performed. If the top tabs of the package were wetted with milk, this last joint would not be completely sealed and, in many cases, may remain fully open.

Since the packing machine operates at a high speed, it is not possible to directly observe whether the milk is foaming or not. This can only be established by testing the strength of the welded joint at the top of the finished package. Testing is done by manually pulling apart the upper joint and observing whether separation occurred in the initial contact surface or in the cardboard material. The former case is indicative of a poor weld joint, while the latter means that the joint is stronger than the cardboard material itself. The tests shows that all the untreated packages are fully open while all the treated packages parted in the cardboard material, indicating that, in these cases, foaming is on an acceptable level.

EXAMPLE 2

In the same manner as in Example 1, a one-liter cardboard blank was coated with a solution of urea and one of the antifoaming compounds listed below.

| Compound | Label |
|---|---|
| $C_3H_7O(C_3H_6O)_{31}(C_2H_4O)_9H$ | A |
| $C_2H_5O(C_2H_4O)_{10}(C_3H_6O)_{69}H$ | B |
| $C_2H_5O(C_2H_4O)_{20}(C_3H_6O)_{69}H$ | C |
| $C_9H_{19}C_6H_4O(C_3H_6O)_{40}(C_2H_4O)_4H$ | D |
| $C_9H_{19}C_6H_4O(C_3H_6O)_{40}(C_2H_4O)_8H$ | E |
| $HO(C_3H_6O)_{75}H$ | F |

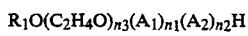    G

| Compound | Label |
|---|---|
| $C_{11}H_{23}COO(C_3H_6O)_4H$ | H |
| $C_{11}H_{23}CONHC_2H_4O(C_3H_6O)_{15}H$ | I |
| $C_{11}H_{23}SC_2H_4O(C_3H_6O)_{15}H$ | J |
| $C_{11}H_{23}CONHC_2H_4O(C_3H_6O)_{30}H$ | K |
| $C_{14}H_{29}COO(C_3H_6O)_{10}C_3H_7$ | L |
| $C_{16}H_{33}COO(C_3H_6O)_{20}H$ | M |

Reference

| Compound | Label |
|---|---|
| $C_9H_{19}C_6H_4O(C_2H_4O)_{10}H$ | I |
| $C_{12}H_{25}O(C_2H_4O)_8(C_3H_6O)_4H$ | II |
| $C_{11}H_{23}COONHC_2H_4O(C_2H_4O)_{15}H$ | III |

After the cardboard blanks has been joined at the bottom and at the side, 1 liter of cold skim milk is poured from a height of 30 cm. The foaming level is immediately determined and if it reached a height of less than 3 mm above the one-liter level of the package, the antifoaming effect is rated as being excellent, if it is less than 10 mm, it is rated acceptable, and if it was 10 mm or above, it was rated as not being acceptable. The following results are obtained.

| Compound | Antifoaming |
| --- | --- |
| A | Excellent |
| B | Acceptable |
| C | Acceptable |
| D | Acceptable |
| E | Acceptable |
| F | Excellent |
| G | Acceptable |
| H | Acceptable |
| I | Acceptable |
| J | Acceptable |
| K | Excellent |
| L | Acceptable |
| M | Acceptable |
| Reference | |
| I | Not acceptable* |
| II | Not acceptable* |
| III | Not acceptable* |

*The foam overflowed the rims of the packages.

From these results it appears that the antifoaming agents containing the water-insoluble compounds according to the present invention, yielded the desired antifoaming effect, whereas the comparative, water-soluble compounds I, II and III did not produce the desired antifoaming effect.

I claim:

1. A package capable of preventing foam formation when being filled with liquid aqueous products, characterized in that at least a part of the inner side of the material forming the package is coated with an antifoaming agent comprising an antifoaming, water-insoluble compound encapsulated in crystalline urea.

2. The package as claimed in claim 1, wherein the antifoaming, water-insoluble compound has a molecular weight of 400–10,000 and comprises at least 40% by weight of alkenoxy groups having 2–4 carbon atoms, of which at least 60% are alkenoxy groups having 3–4 carbon atoms.

3. The package as claimed in claim 1, wherein the antifoaming, water-insoluble compound has a molecular weight of 1,000–6,000 and comprises at least 80% by weight of alkenoxy groups having 2–4 carbon atoms, of which at least 60% are alkenoxy groups having 3–4 carbon atoms.

4. The package as claimed in claim 1, wherein the antifoaming, water-insoluble compound is of the general formula $$R[X(A_1)_{n_1}(A_2)_{n_2}]_m H \qquad \text{I}$$

wherein R is a hydrocarbon group having 1–30 carbon atoms, hydrogen or a group of the formula $R_1(A_3)_{n_3}$ wherein $R_1$ is hydrogen or a hydrocarbon group having 1–30 carbon atoms, $A_3$ is an alkylenoxy group having 2–4 carbon atoms, $n_3$ is 0 to 30, X is —O—,

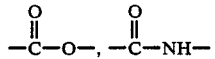

or —S—, $A_1$ and $A_2$ are each an alkylenoxy group having 2–4 carbon atoms, $n_1$ and $n_2$ are each 0 to 100, m is 1–4, $n_1$, $n_2$, $n_3$ and m being so selected that the number of alkylenoxy groups is from 15 to 120.

5. The package as claimed in claim 2, wherein the antifoaming, water-insoluble compound is of the general formula $$R[X(A_1)_{n_1}(A_2)_{n_2}]_m H \qquad \text{I}$$

wherein R is a hydrocarbon group having 1–30 carbon atoms, hydrogen or a group of the formula $R_1(A_3)_{n_3}$ wherein $R_1$ is hydrogen or a hydrocarbon group having 1–30 carbon atoms, $A_3$ is an alkylenoxy group having 2–4 carbon atoms, $n_3$ is 0 to 30, X is —O—,

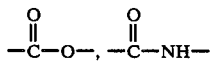

or —S—, $A_1$ and $A_2$ are each an alkylenoxy group having 2–4 carbon atoms, $n_1$ and $n_2$ are each 0 to 100, m is 1–4, $n_1$, $n_2$, $n_3$ and m being so selected that the number of alkylenoxy groups is from 15 to 120.

6. The package as claimed in claim 1, wherein the antifoaming, water-insoluble compound is of the general formula $$R[X(A_1)_{n_1}(A_2)_{n_2}]_m H \qquad \text{I}$$

wherein R is a hydrocarbon group having 1–30 carbon atoms, hydrogen or a group of the formula $R_1(A_3)_{n_3}$ wherein $R_1$ is hydrogen or a hydrocarbon group having 1–30 carbon atoms, $A_3$ is an alkylenoxy group having 2–4 carbon atoms, $n_3$ is 0 to 30, X is —O—,

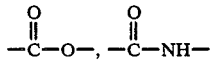

or —S—, $A_1$ and $A_2$ are each an alkylenoxy group having 2–4 carbon atoms, $n_1$ and $n_2$ are each 0 to 100, m is 1–4, $n_1$, $n_2$, $n_3$ and m being so selected that the number of alkylenoxy groups is from 25 to 90.

7. The package as claimed in claim 2, wherein the antifoaming, water-insoluble compound is of the general formula $$R[X(A_1)_{n_1}(A_2)_{n_2}]_m H \qquad \text{I}$$

wherein R is a hydrocarbon group having 1–30 carbon atoms, hydrogen or a group of the formula $R_1(A_3)_{n_3}$ wherein $R_1$ is hydrogen or a hydrocarbon group having 1–30 carbon atoms, $A_3$ is an alkylenoxy group having 2–4 carbon atoms, $n_3$ is 0 to 30, X is —O—,

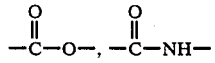

or —S—, $A_1$ and $A_2$ are each an alkylenoxy group having 2–4 carbon atoms, $n_1$ and $n_2$ are each 0 to 100, m is 1-4, $n_1$, $n_2$, $n_3$ and m being so selected that the number of alkylenoxy groups is from 25 to 90.

8. The package as claimed in claim 4, wherein at least 50% of $A_1$ are alkylenoxy groups having 3-4 carbon atoms and at least 50% of $A_2$ are ethylenoxy groups.

9. The package as claimed in claim 4, wherein at least 70% of $A_1$ are alkylenoxy groups having 3-4 carbon atoms and at least 70% of $A_2$ are ethylenoxy groups.

10. The package as claimed in claim 5, wherein at least 50% of $A_1$ are alkylenoxy groups having 3-4 carbon atoms and at least 50% of $A_2$ are ethylenoxy groups.

11. The package as claimed in claim 5, wherein at least 70% of $A_1$ are alkylenoxy groups having 3-4 carbon atoms and at least 70% of $A_2$ are ethylenoxy groups.

12. The package as claimed in claim 1, wherein the antifoaming, water-insoluble compound is of the formula $$R_1O(C_2H_4O)_{n_3}(A_1)_{n_1}(A_2)_{n_2}H \qquad \text{III}$$

wherein $R_1$ is an aliphatic saturated group having 1-12 carbon atoms, $A_1$ and $A_2$ are each an alkylenoxy group having 2-4 carbon atoms, in which at least 70% of $A_1$ are alkylenoxy groups having 3-4 carbon atoms and at least 70% of $A_2$ are ethylenoxy groups, $n_1$ is 20 to 70, $n_2$ is 6 to 30 and $n_3$ is 0 to 5.

13. The package as claimed in any one of claims 1-12, wherein the weight ratio of the crystalline urea to antifoaming, water-insoluble compound is 9:1-1:1.

14. The package as claimed in any one of claims 1-12, wherein the weight ratio of the crystalline urea to antifoaming, water-insoluble compound is 8:1-3:2.

* * * * *